United States Patent
Seki

(10) Patent No.: US 7,882,225 B2
(45) Date of Patent: Feb. 1, 2011

(54) INFORMATION PROCESSING DEVICE, AND METHOD AND COMPUTER READABLE MEDIUM FOR THE SAME

(75) Inventor: Takao Seki, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 69 days.

(21) Appl. No.: 12/241,941

(22) Filed: Sep. 30, 2008

(65) Prior Publication Data

US 2009/0089423 A1 Apr. 2, 2009

(30) Foreign Application Priority Data

Oct. 2, 2007 (JP) .............................. 2007-258892

(51) Int. Cl.
G06F 15/173 (2006.01)
(52) U.S. Cl. ......................... 709/224; 709/217; 358/1.1; 358/1.15
(58) Field of Classification Search ................. 709/224, 709/217, 219, 227, 228; 358/1.1, 1.15, 1.14, 358/1.16; 379/202.01
See application file for complete search history.

(56) References Cited

U.S. PATENT DOCUMENTS

| | | | | |
|---|---|---|---|---|
| 5,517,316 A | * | 5/1996 | Hube | .......................... 358/296 |
| 7,221,885 B2 | * | 5/2007 | Sato | .............................. 399/81 |
| 2006/0061819 A1 | * | 3/2006 | Fujiwara et al. | ............. 358/1.15 |
| 2006/0070120 A1 | | 3/2006 | Aoki et al. | |
| 2007/0284442 A1 | * | 12/2007 | Herskovitz | .................. 235/383 |
| 2007/0291284 A1 | * | 12/2007 | Kittaka et al. | ................. 358/1.1 |
| 2009/0207449 A1 | * | 8/2009 | Johnson et al. | ............. 358/1.15 |

FOREIGN PATENT DOCUMENTS

| | | |
|---|---|---|
| JP | 2004-102549 | 4/2004 |
| JP | 2006-74527 | 3/2006 |
| JP | 2007-174258 | 7/2007 |

* cited by examiner

*Primary Examiner*—Frantz B Jean
(74) *Attorney, Agent, or Firm*—Scully, Scott, Murphy & Presser, P.C.

(57) ABSTRACT

There is provided an information processing device comprising: an image processing unit including at least one of an image reading function and a print function; a historical information acquisition unit to acquire a plurality of pieces of historical information, each of the plurality of pieces of historical information concerning execution of at least one of the image reading and print functions; a historical information transmission unit to transmit the historical information to the client device; a request reception unit to receive from the client device a request for data corresponding to a selected piece of historical information selected from the plurality of pieces of historical information through the client device, the data concerning a job executed by at least one of the image reading function and the print function; and a data obtaining unit configured to obtain the data corresponding to the request received by the request reception unit.

12 Claims, 5 Drawing Sheets

| DATA HISTORY FILE INFORMATION ||||
|---|---|---|---|
| ID | FILENAME | THUMBNAIL FILENAME | REGISTRATION DATE AND TIME |
| ID00001 | Pic001. jpg | Spic0001. jpg | 2007/7/11 20:54 |
| ID00002 | Pic002. jpg | Spic0002. jpg | 2007/7/14 14:24 |
| ID00003 | Prn001. prn | | 2007/7/14 15:08 |
| ID00004 | Pic003. jpg | Spic0003. jpg | 2007/7/15 16:44 |
| ID00005 | Prn002. prn | | 2007/7/16 14:33 |

FIG. 6

INFORMATION PROCESSING DEVICE, AND METHOD AND COMPUTER READABLE MEDIUM FOR THE SAME

CROSS-REFERENCE TO RELATED APPLICATION

This application claims priority under 35 U.S.C. §119 from Japanese Patent Application No. 2007-258892, filed on Oct. 2, 2007. The entire subject matter of the application is incorporated herein by reference.

BACKGROUND

1. Technical Field

Aspects of the present invention relate to an information processing device configured to have at least one of an image scanning unit and an image formation unit and to be used in a network system including a client PC and a server.

2. Related Art

Information processing devices configured to have an image scanning unit and an image formation unit and to be connectable to a network including a client PC and a server have been widely used. As an example of such information processing devices, Japanese Patent Provisional Publication No. 2004-102549A (hereafter, referred to as JP2004-102549A) discloses a copying device used in a network system. In the network system disclosed in JP2004-102549A, the server stores historical data containing a user ID of a user who requested a print operation through the copying device, copy data and a corresponding job ID, while associating the historical data, the copy data and the job ID with each other.

The server has a function of notifying the copying device of the job ID, and the copying device has a function of sending an e-mail to a user to notify the user of the job ID so as to enable the user to reuse the copy data associated with the job ID. In order to reuse the copy data associated with the job ID, the user inputs the job ID to the copying device, for example, by sending an e-mail containing the job ID to the copying device. After the job ID is inputted, the server checks whether the inputted job ID matches the job ID stored in the historical data. If the inputted job ID matches the job ID in the historical data, the server sends the copy data corresponding to the job ID to the copying device.

As a result, the copying device is able to obtain the copy data to be reused from the server, and to print the copy data again. In the network system disclosed JP2004-102549A, data (e.g., copy data) is accumulated in the server without intervention by the user. Therefore, the network system is very convenient for the user who wants to reuse the accumulated data.

SUMMARY

However, the network system disclosed in JP2004-102549A has the following drawbacks.

(a1) In the network system, only a user who has received the e-mail containing the job ID (i.e., a user who has requested the print operation corresponding to the job ID in the past) is allowed to reuse the copy data. Other users are not allowed to reuse the copy data. Considering a group of members belonging to the same department, reuse of copy data used by one of the members in the past is not allowed for all of the members.

(a2) One of solutions for the above drawback (a1) is an accessing manner where each of the users directly accesses the copy data managed by the server to reuse the copy data. However, in consideration of protection of personal and private information managed in the server, it is necessary to configure the server to limit access to data managed in the server so that only authorized users can obtain the historical data and the copy data stored in the server. If a user for whom the copy data is registered in the server is not the authorized user of the server, the user needs to get permission for accessing the server from an administrator of the server. Therefore, this solution is not convenient for the users.

(a3) In the case where the historical data is stored in the server, the historical data may include information concerning all of a plurality of information processing devices (e.g., copying devices) in the network system. Therefore, if the historical data in the server is opened to all the information processing devices, data concerning execution of the scanning operation on one of information processing devices is displayed on another information processing device. Such a configuration may raise a problem concerning protection of information.

Aspects of the present invention are advantageous in that an information processing device enabling users to reuse data concerning execution of a scanning operation and/or a print operation while achieving a high degree of usability in reusing such data is provided.

According to an aspect of the invention, there is provided an information processing device that is to be connected to a client device via a network. The information processing device comprises: an image processing unit including at least one of an image reading function and a print function; a historical information acquisition unit configured to acquire a plurality of pieces of historical information, each of the plurality of pieces of historical information concerning execution of at least one of the image reading function and the print function; a historical information transmission unit configured to transmit the historical information to the client device; a request reception unit configured to receive from the client device a request for data corresponding to a selected piece of historical information that is selected from the plurality of pieces of historical information through the client device, the data concerning a job executed by at least one of the image reading function and the print function; and a data obtaining unit configured to obtain the data corresponding to the request received by the request reception unit.

Since the information processing device acquires the historical information, the information processing device is able to provide the historical information for a client device when the user operates the client device to reuse the data. Such a configuration of the information processing device makes it possible to display the historical information on the client device and to allow the user to select the data to be reused from a plurality of pieces of jobs contained in the historical information. In this case, the information processing device is able to obtain the data specified by the user. Therefore, the user who is allowed to use the information processing device is able to smoothly reuse the data concerning the image reading function or the print function.

According to another aspect of the invention, there is provided a method to be implemented on an information processing device that is to be connected to a client device via a network and includes at least one of an image reading function and a print function. The method comprises the steps of: acquiring a plurality of pieces of historical information, each of the plurality of pieces of historical information concerning execution of at least one of the image reading function and the print function; transmitting the historical information to the client device; receiving from the client device a request for data corresponding to a selected piece of historical information that is selected from the plurality of pieces of historical information through the client device, the data concerning a job executed by at least one of the image reading function and the print function; and obtaining the data corresponding to the received request.

Since the information processing device acquires the historical information, the information processing device is able to provide the historical information for a client device when the user operates the client device to reuse the data. Such a configuration of the information processing device makes it possible to display the historical information on the client device and to allow the user to select the data to be reused from a plurality of pieces of jobs contained in the historical information. In this case, the information processing device is able to obtain the data specified by the user. Therefore, the user who is allowed to use the information processing device is able to smoothly reuse the data concerning the image reading function or the print function.

According to another aspect of the invention, there is provided a computer readable medium having computer readable instruction stored thereon, which, when executed by a processor of an information processing device that is to be connected to a client device via a network and includes at least one of an image reading function and a print function, configures the processor to perform the steps of: acquiring a plurality of pieces of historical information, each of the plurality of pieces of historical information concerning execution of at least one of the image reading function and the print function; transmitting the historical information to the client device; receiving from the client device a request for data corresponding to a selected piece of historical information that is selected from the plurality of pieces of historical information through the client device, the data concerning a job executed by at least one of the image reading function and the print function; and obtaining the data corresponding to the received request.

Since the information processing device acquires the historical information, the information processing device is able to provide the historical information for a client device when the user operates the client device to reuse the data. Such a configuration of the information processing device makes it possible to display the historical information on the client device and to allow the user to select the data to be reused from a plurality of pieces of jobs contained in the historical information. In this case, the information processing device is able to obtain the data specified by the user. Therefore, the user who is allowed to use the information processing device is able to smoothly reuse the data concerning the image reading function or the print function.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 1 schematically illustrates a network system in which MFPs according to an embodiment are provided.

FIG. 6 illustrates a data structure of historical data stored in the MFP.

DETAILED DESCRIPTION

Hereafter, an embodiment according to the invention will be described with reference to the accompanying drawings.

Figure 1:
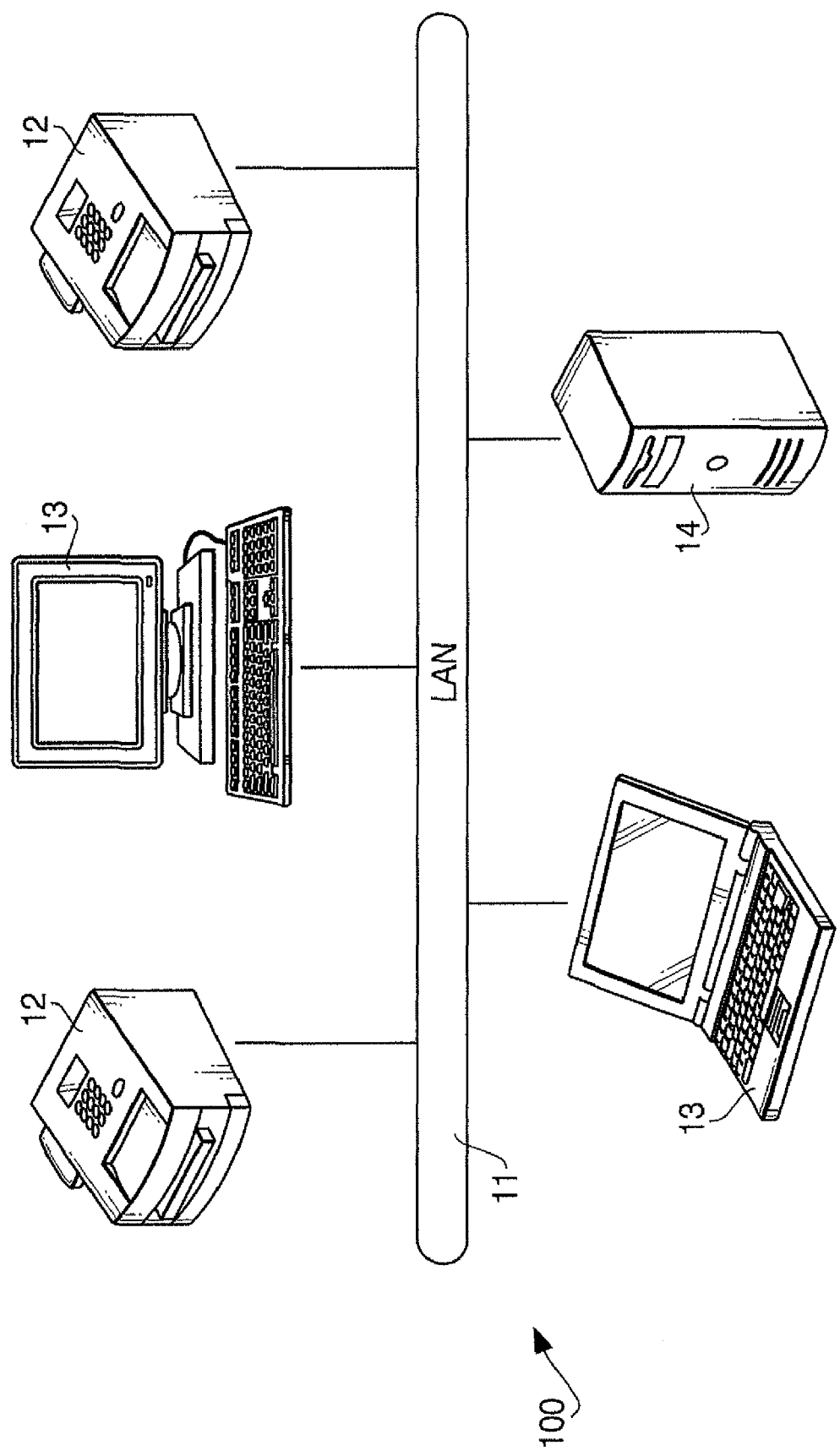

FIG. 1 schematically illustrates a network system 100 in which MFPs (multifunction peripherals) 12 according to an embodiment are provided. In the network system 100, a plurality of MFPs 12 are connected to a LAN 11. Each MFP 12 has multiple functions of printing images and scanning documents. That is, the MFP 12 is provided with a print engine 28 for the printing function and a scanner 27 for the scanning function (see FIG. 5).

To the LAN 11, a server 14 and PCs (personal computers) 13 are also connected. Although in FIG. 1 two PCs 13 are illustrated, more than two PCs 13 may be connected to the LAN 11. That is, more than two PCs 13 may be communicatably connected to the MFP 12.

Figure 5:
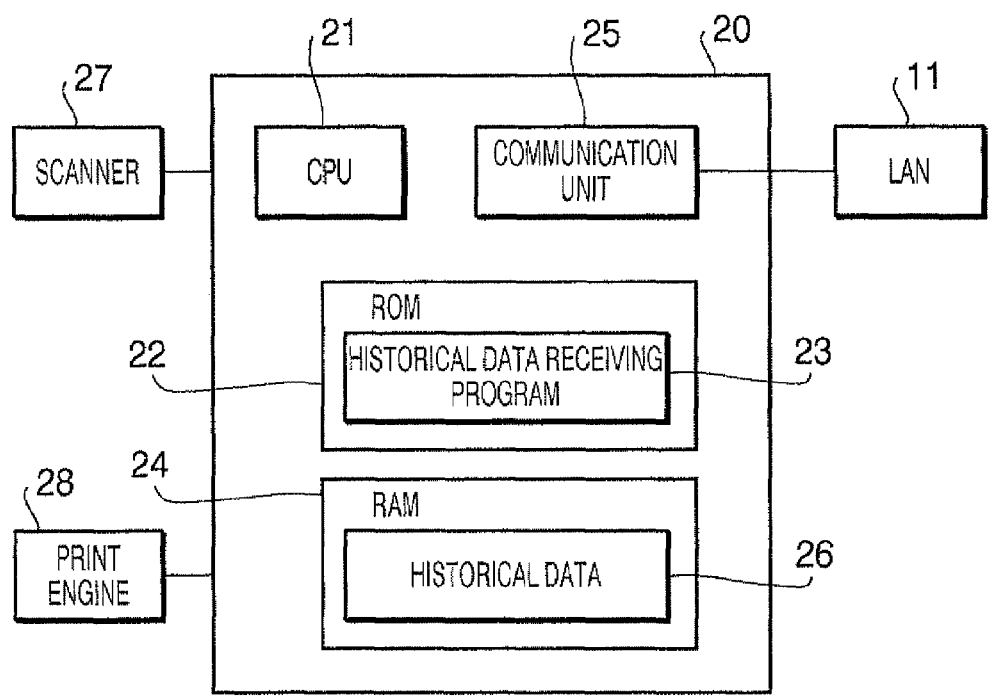
FIG. 5 is a block diagram of a control unit of the MFP.

FIG. 5 is a block diagram of the MFP 12 illustrating a configuration of a control unit 20 of the MFP 12. The control unit 20 includes a CPU 21, a ROM 22, a RAM 24, and a communication unit 25. The ROM 22 stores a historical data receiving program 23. The RAM 24 is used as a work memory for the CPU 21. The CPU 21 records historical data 26 in the RAM 24. The communication unit 25 interfaces the MFP 12 with the LAN 11. To the control unit 20, the scanner 27 and the print engine 28 are connected.

Figure 2:
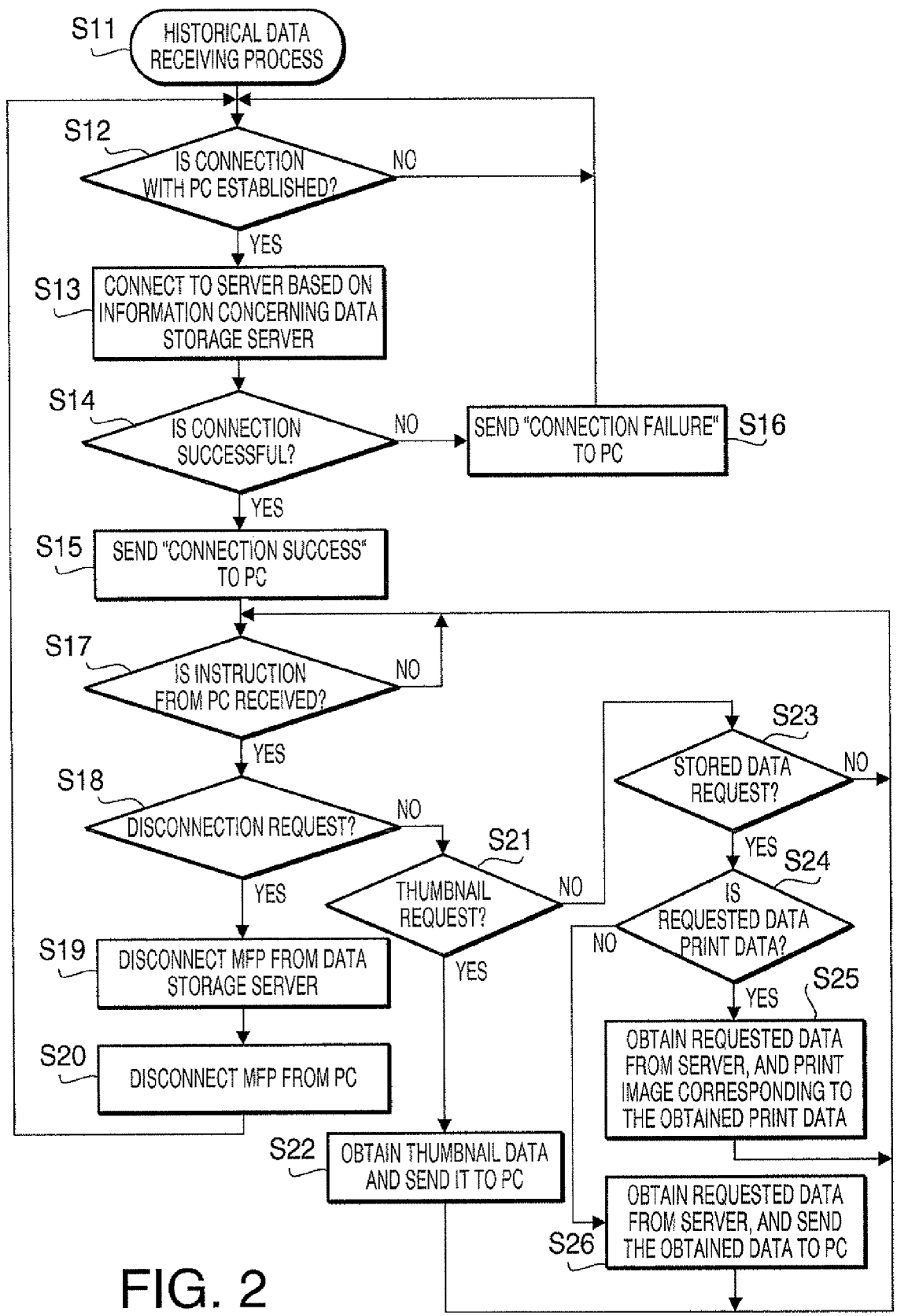
FIG. 2 is a flowchart of a historical data receiving process executed by the MFP.

Hereafter, a historical data receiving process executed under control of the CPU 21 of the MFP 12 is explained. The historical data receiving process is started by loading and executing the historical data receiving program 23. FIG. 2 is a flowchart of the historical data receiving process.

First, the CPU 21 waits until connection with the PC 13 is established (step S12: NO). When the connection with the PC 13 is established (S12: YES), control proceeds to step S13 where the CPU 21 connects to the server 14 through the LAN 11 in accordance with information concerning a data storage server stored in the MFP 12. If connection with the server 14 is successfully established (S14: YES), the CPU 21 sends information indicating that connection with the server 14 is successfully established, to the PC 13 (step S15).

If connection with the server 14 is failed (S14: NO), the CPU 21 sends information indicating that connection with the server 14 is failed, to the PC 13 (step S16). Then, control returns to step S12.

After step S15 is processed, the CPU 21 waits for an instruction from the PC 13 (step S17: NO). When an instruction is received from the PC 13 (S17: YES), the CPU 21 judges whether the instruction is a disconnection request (step S18). If the instruction is not the disconnection request (S18: NO), the CPU 21 judges whether the request is a thumbnail request (step S21). If the instruction is not the thumbnail request (S21: NO), the CPU 21 judges whether the instruction is a stored data request (step S23).

If the instruction is the stored data request (S23: YES), control proceeds to step S24 where the CPU 21 judges whether the requested data is print data having a print data format (step S24). If the requested data is print data (S24: YES), the CPU 21 obtains the requested data (print data) from the server 14 and prints an image corresponding to the obtained print data through the print engine 28 (step S25). Then, control returns to step S17 to process a next instruction.

If the requested data is not print data (S24: NO), the CPU 21 obtains the requested data (i.e., scanned data having an image data format) from the server 14 and sends the obtained data (scanned data) to the PC 13 (step S26). Then, control returns to step S17. It is noted that the PC 13 which received the scanned data (e.g., image data) is able to display the scanned data on a display thereof.

If the instruction is not the stored data request (S23: NO), control returns to step S17.

If the instruction is the thumbnail request (S21: YES), the CPU 21 obtains thumbnail data corresponding to the thumbnail request from the server 14, and sends the obtained thumbnail data to the PC 13 (step S22). Then, control returns to step S17.

If the instruction is the disconnection request (S18: YES), the CPU 21 disconnects the MFP 12 from the server 14 (step S19). Next, the CPU 21 disconnects the MFP 12 from the PC 13 (step S20). Then, control returns to step S12.

Figure 3:
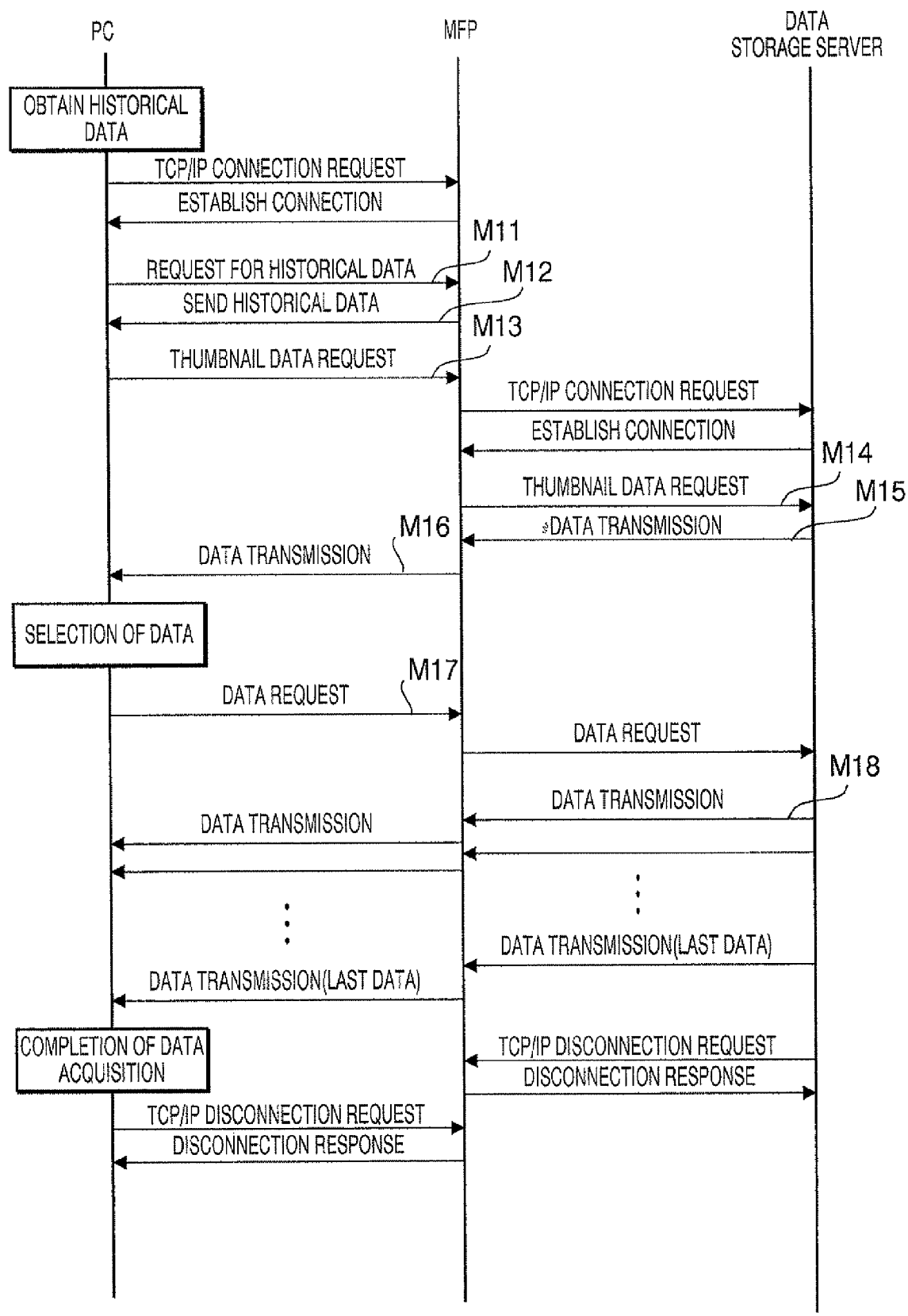
FIG. 3 is a sequence diagram illustrating a communication scheme between a PC, the MFP and a server in the historical data receiving process.

The operations of the PC 13, the MFP 12 and the server 14 in the historical data receiving process are explained with reference to FIG. 3. FIG. 3 is a sequence diagram illustrating a communication scheme between the PC 13, the MFP 12 and the server 14 in the historical data receiving process.

The PC 13 waits for a request for the stored data from a user who wants to reuse the stored data (e.g., scanned data which the user obtained in the past through the scanning function of the MFP 12).

When the PC 13 receives the request from the user, the PC 13 connects to the MFP 12 via the LAN 11. More specifically, in this case the PC 13 sends a TCP/IP-based connection request to the MFP 12 (S12: YES), and the MFP 12 establishes the connection with the PC 13 (S14: YES).

Next, the PC 13 sends a request for historical data (M11) to the MFP 12 (S23: YES). The MFP 12 sends historical data (M12) which was generated by the MFP 12, to the PC 13. The historical data contains parameters concerning the scanning function or the printing function executed on the MFP 12 in the past (see FIG. 6).

Then, the PC 13 sends the thumbnail data request (M13) to the MFP 12. The thumbnail data request is a request for thumbnail data concerning the scanned data or the print data associated with the historical data. Since the thumbnail data concerning the historical data is stored in the server 14 (i.e., the MFP 12 does not store the thumbnail data), the MFP 12 operates to obtain the thumbnail data from the server 14. More specifically, the MFP 12 sends a TCP/IP based connection request to the server 14. Then, the server 14 establishes the connection with the MFP 12.

Next, the MFP 12 requests the thumbnail data from the server 14 (M14, "S21: YES"). The server 14 sends the requested thumbnail data to the MFP 12 (M15). The MFP 12 which received the thumbnail data from the server 14 sends the thumbnail data to the PC 13 (M16, S22).

FIG. 6 illustrates a data structure of the historical data stored in the MFP 12. As shown in FIG. 6, the historical data includes, for each of a plurality of pieces of scanned data and print data used on the MFP 12 in the past, an ID uniquely specifying the stored data, a filename of the stored data, a thumbnail filename, and information representing a date and time when the data is registered. In FIG. 6, each of data G1, data G2 and data G4 is scanned data.

Figure 4:
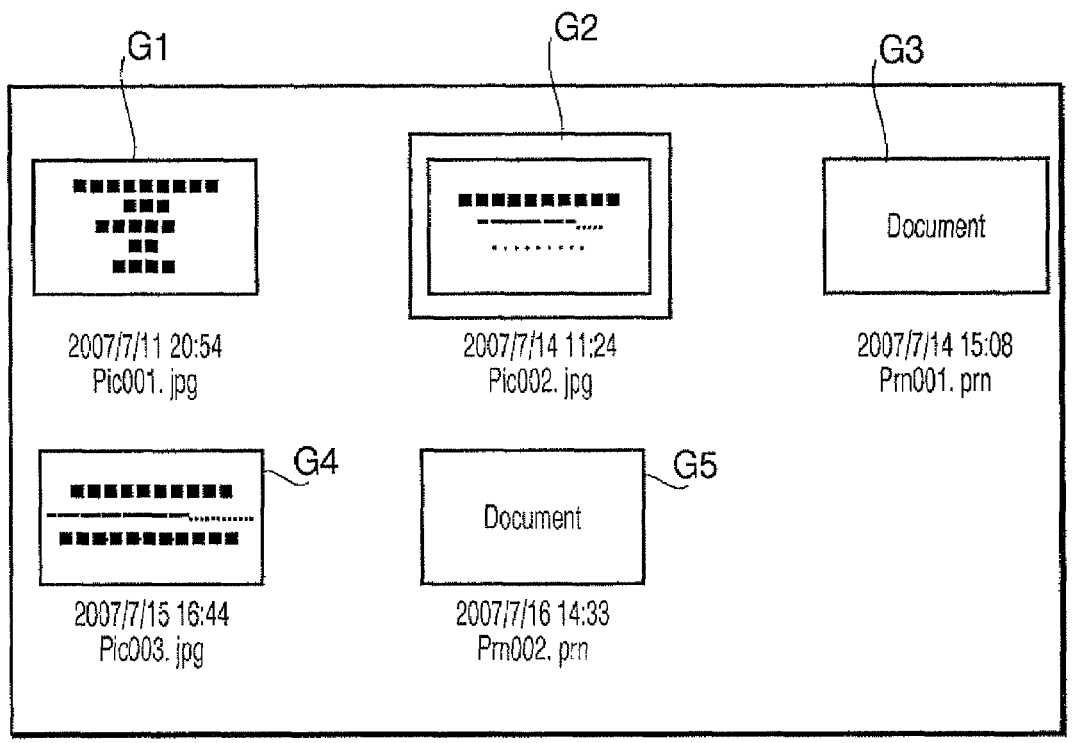
FIG. 4 is an example of onscreen representation of thumbnail images on a display of the PC.

The PC 13 displays images corresponding to the received thumbnail data. FIG. 4 is an example of onscreen representation of the thumbnail images on the display of the PC 13. In FIG. 4, thumbnail images of the scanned data G1, G2 and G4 are displayed. Under each thumbnail image, the date and time when the data is scanned on the MFP 12, and the filename of the scanned data are displayed. Since data G3 and G5 is print data, an icon indicating the data is document data is represented on the display in place of displaying a thumbnail image. Under the icon "document", the date and time when the data is printed and the filename of the print data are displayed.

Through the screen shown in FIG. 4, the user is able to select the stored data to be reused. That is, the user clicks one of the icons or thumbnail images. Since images of the scanned data are displayed on the PC 13, the user is able to select the desired scanned data without knowledge about the filename of the desired scanned data. Regarding the print data, the date and time when the print data is printed on the MFP is displayed under the icon. Such a configuration enables the user to select the desired image data to be reused based on the date and time without knowledge about the filename of the print data.

In response to the selection (clicking) of the desired data by the user, the PC 13 sends a stored data request (M17) to the MFP 12. After receiving the stored data request, the MFP 12 sends the filename corresponding to the requested data to the server 14. Then, the server 14 sends sequentially data corresponding to the requested filename to the MFP 12 (M18).

If the requested data is print data, the MFP 12 prints the print data without waiting for reception of a print command (S25). On the other hand, if the requested data is the scanned data, the MFP 12 sends the scanned data obtained from the server 14 to the PC 13 (S26). The PC 13 displays the scanned data received from the MFP 12.

It is noted that the server 14 is not accessed directly from the PC 13. Therefore, even if the server 14 is configured to limit access from an unauthorized PC, the server is not accessed by the unauthorized PC 13. Therefore, data security can be maintained.

It is noted that the MFP 12 has a function of registering the print data and the scanned data in the server 14. That is, the MFP 12 is a source device of the print data and the scanned data. In other words, the server 14 does not reply the request from the PCs 13, but only provides the requested data to the MFP 12 which processed the requested data and registered the requested data in the server 14 in the past. Therefore, the fact that the server 14 provides the requested data (the scanned data or the print data) for the MFP 12 does not affect the data security in the network system 100.

After the PC 13 receives the requested data, the user clicks a button for completion of the data acquisition (not shown in FIG. 4). Then, the MFP 12 is disconnected from the server 14. The PC 13 is disconnected from the MFP 12.

As described above, the MFP 12 includes a historical data storage unit ("26" in FIG. 5). The communication unit 25 sends the historical data 26 corresponding to a plurality of pieces of print data and/or scanned data to the PC 13 in response to the request for historical data of the PC 13. The communication unit 25 receives a request for specified historical data from the PC 13, and obtains the registered data corresponding to the specified historical data from the server 14.

By storing the historical data in the MFP 12, the MFP 12 is able to provide the historical data to the PC 13 so that the PC 13 is able to display images corresponding to the historical data (e.g., thumbnail images) and the user is able to select desired data to be reused on the screen. By sending the filename of the data selected by the user to the server 14, the MFP 12 is able to obtain only the data corresponding to the selected filename from the server 14. Such a configuration enables all of the available users of the MFP 12 to easily obtain the desired data to be reused.

The historical data storing unit of the MFP 12 stores its own historical data. The MFP 12 obtains the data related to its own historical data from the server 14. That is, the MFP 12 is able to display its own historical data on the PC 13 when the user wants to reuse the data so that the user is allowed to select one of the plurality of pieces of stored data. The MFP 12 sends the filename corresponding to the selected data to the server 14 to instruct the server 14 to send only the selected data. Therefore, all of the users of the MFP 12 are able to easily reuse the stored data.

By contract, if the server 14 has historical data storing all of pieces of data which the server 14 received from MFPs 12 in the past, a certain MFP receives history of another MFP. Such a configuration may raise a problem concerning data security.

However, according to the embodiment, the historical data concerning a certain MFP is provided for the user of the certain MFP. Therefore, data security can be enhanced. Such a configuration also eliminates the need for implementing the function of extracting particular historical data corresponding to the requesting source MFP 12 from a plurality of pieces of historical data, on the server 14.

The MFP 12 is able to place, for each of users, a restriction on the execution of the scanner function or the print function. If such restrictions are applied to the users, the users are allowed to see the historical data within the range of the use restrictions. In this case, no problem arises in regard to the data security.

The MFP 12 which is provided with the scanner 27 sends the scanned data obtained by the scanner 27 to the PC 13. When the user wants to reuse the scanned data, the PC 13 is able to receive the scanned data from the MFP 12. Such a configuration enhances usability of the MFP 12.

The MFP 12 which is provided with the print engine 28 prints the print data corresponding to the historical data without receiving a print command. Such a configuration also enhances the usability of the MFP 12.

Although the present invention has been described in considerable detail with reference to certain preferred embodiments thereof, other embodiments are possible.

In the above mentioned embodiment, the various functions including the historical data receiving process are implemented on the MFP 12. However, the various functions including the historical data receiving process may be implemented on various types of information processing devices, such as a copying device, a facsimile device, or a printer with a scanning function.

What is claimed is:

1. An information processing device that is to be connected to a client device and a server via a network, comprising:
   an image processing unit including at least one of an image reading function and a print function;
   a historical information acquisition unit configured to acquire a plurality of pieces of historical information, each of the plurality of pieces of historical information concerning execution of at least one of the image reading function and the print function;
   a historical information transmission unit configured to transmit the plurality of pieces of historical information to the client device;
   a request reception unit configured to receive from the client device a request for data corresponding to a selected piece of historical information that is selected from the plurality of pieces of historical information through the client device, the data concerning a job executed by at least one of the image reading function and the print function, wherein the data includes one of image data generated by the image reading function and print data used for execution of the print function; and
   a data obtaining unit configured to obtain from the server the data corresponding to the request received by the request reception unit.

2. The information processing device according to claim 1, further comprising a use restriction unit configured to set, for each of users, restriction on execution of at least one of the image reading function and the print function.

3. The information processing device according to claim 1, further comprising a data transmission unit configured to transmit the data obtained by the data obtaining unit to the client device if the data obtained by the data obtaining unit has an image file format.

4. The information processing device according to claim 1, further comprising a control unit configured to control the image processing unit to execute the print function for the data obtained by the data obtaining unit if the data obtained by the data obtaining unit has a print file format.

5. The information processing device according to claim 1, further comprising a historical information registration unit configured to register the plurality of pieces of historical information.

6. The information processing device according to claim 1, wherein each of the plurality of pieces of historical information includes a thumbnail image.

7. A method to be implemented on an information processing device that is to be connected to a client device and a server via a network and includes at least one of an image reading function and a print function, the method comprising the steps of:
   acquiring a plurality of pieces of historical information, each of the plurality of pieces of historical information concerning execution of at least one of the image reading function and the print function;
   transmitting the plurality of pieces of historical information to the client device;
   receiving from the client device a request for data corresponding to a selected piece of historical information that is selected from the plurality of pieces of historical information through the client device, the data concerning a job executed by at least one of the image reading function and the print function, wherein, the data includes one of image data generated by the image reading function and print data used for execution of the print function, the data being stored on the server; and
   obtaining the data corresponding to the received request from the server.

8. The method according to claim 7, further comprising the step of transmitting the obtained data to the client device if the obtained data has an image file format.

9. The method according to claim 7, further comprising the step of executing the print function for the obtained data if the obtained data has a print file format.

10. A computer readable medium having computer readable instruction stored thereon, which, when executed by a processor of an information processing device that is to be connected to a client device and a server via a network and includes at least one of an image reading function and a print function, configures the processor to perform the steps of:
    acquiring a plurality of pieces of historical information, each of the plurality of pieces of historical information concerning execution of at least one of the image reading function and the print function;

transmitting the plurality of pieces of historical information to the client device;

receiving from the client device a request for data corresponding to a selected piece of historical information that is selected from the plurality of pieces of historical information through the client device, the data concerning a job executed by at least one of the image reading function and the print function, wherein the data includes one of image data generated by the image reading function and print data used for execution of the print function, the data being stored on the server; and obtaining the data corresponding to the received request from the server.

11. The computer readable medium according to claim 10, wherein the instruction further configures the processor to perform the step of transmitting the obtained data to the client device if the obtained data has an image file format.

12. The computer readable medium according to claim 10, wherein the instruction further configures the processor to perform the step of executing the print function for the obtained data if the obtained data has a print file format.

* * * * *